United States Patent
Murad et al.

(10) Patent No.: US 10,863,106 B1
(45) Date of Patent: Dec. 8, 2020

(54) SYSTEMS AND METHODS FOR LED FLICKERING AND BANDING DETECTION

(71) Applicant: GM GLOBAL TECHNOLOGY OPERATIONS LLC, Detroit, MI (US)

(72) Inventors: Mohannad Murad, Troy, MI (US); Sai Vishnu Aluru, Commerce, MI (US); Joseph G. Machak, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/658,795

(22) Filed: Oct. 21, 2019

(51) Int. Cl.
*H04N 5/235* (2006.01)
*G06K 9/00* (2006.01)
*G06T 5/00* (2006.01)

(52) U.S. Cl.
CPC ....... *H04N 5/2357* (2013.01); *G06K 9/00791* (2013.01); *G06K 9/00805* (2013.01); *G06K 9/00825* (2013.01); *G06T 5/005* (2013.01); *B60R 2300/00* (2013.01); *B60R 2300/30* (2013.01); *G06T 2207/30252* (2013.01)

(58) Field of Classification Search
CPC ............. H04N 5/2357; G06K 9/00791–00825
See application file for complete search history.

(56) References Cited

U.S. PATENT DOCUMENTS

| | | | | |
|---|---|---|---|---|
| 2007/0262948 A1* | 11/2007 | Han | ................ | G09G 3/3406 345/102 |
| 2008/0278603 A1* | 11/2008 | Lee | ................ | H04N 5/2353 348/226.1 |
| 2010/0123810 A1* | 5/2010 | Greenland | ........... | H04N 5/2357 348/294 |
| 2011/0255786 A1* | 10/2011 | Hunter | ................ | H04N 5/21 382/190 |
| 2016/0373684 A1* | 12/2016 | Sherman | ................ | B60R 1/00 |
| 2017/0041591 A1* | 2/2017 | Korogi | ................ | G06K 9/00825 |
| 2019/0288020 A1* | 9/2019 | Ikuma | ................ | H04N 5/353 |
| 2019/0335079 A1* | 10/2019 | Koizumi | ................ | H04N 5/2353 |

FOREIGN PATENT DOCUMENTS

CN 103793892 B * 10/2016
WO WO-2018012317 A1 * 1/2018 ............. H04N 5/235

* cited by examiner

*Primary Examiner* — Robert J Hance
(74) *Attorney, Agent, or Firm* — Lorenz & Kopf LLP

(57) ABSTRACT

Vision sensor systems and methods detect banding and flicker. The method includes receiving camera data and identifying a light source location in a frame of camera data and assigning a luminance measure at the light source as a signal reference. A region of interest (ROI) is then associated with the light source. The frame is incremented, and then a signal to noise ratio (SNR) at the light source is calculated. A number, N of frames may be processed to identify banding when it is present, and to identify flicker when it is present. Responsive to identifying banding or identifying flicker, a response for a display system or for a machine vision system is generated.

18 Claims, 3 Drawing Sheets

SYSTEMS AND METHODS FOR LED FLICKERING AND BANDING DETECTION

TECHNICAL FIELD

The present disclosure generally relates to vision sensor systems for mobile platforms, and more particularly relates to vision sensor systems and methods that detect light emitting diode (LED) flicker and banding in real time.

Vision sensor systems for vehicles detect light emitted by objects external to the vehicle. A common type of light emitting object is a LED. LEDs are often used in traffic lights and informational signs, making them a relevant technical problem to address within the field of vision sensor systems. Light emitted from a LED is generally periodically pulsed and described as having a period and a duty cycle. For the duration of the pulse, the LED is actively emitting light, and for the remainder of the period, the LED is off or inactive. When the LED is pulsed at a fast enough frequency, a human eye will perceive it to be constantly on. Vision sensor systems utilize one or more onboard cameras to sense, or capture, the light. Independently, the onboard cameras usually have their own periodicity, called a frame rate. The camera actively captures light during a portion of the frame called an exposure time. Onboard display systems and machine vision systems are often dependent upon the camera data.

When the camera exposure time coincides with the LED pulse, then the camera data captures that the LED is lighted. If the camera frame rate misaligns with the LED pulse frequency, the camera data may incorrectly indicate that the LED is off. In practice, over a plurality of frames, these incorrect determinations can cause undesirable technological effects for display systems and machine vision systems. Examples of such undesirable effects are flicker and banding that can be seen in renderings on the display system. Many available vision sensor systems and methods employ LED flicker mitigation strategies at the point of display systems, in an attempt to address these technological problems.

Accordingly, improved vision sensor systems and methods are desirable. The following disclosure provides a technological solution to address flicker and banding in real time, in addition to addressing related issues. Furthermore, other desirable features and characteristics of the system and method will become apparent from the subsequent detailed description and the appended claims, taken in conjunction with the accompanying drawings and the preceding background.

SUMMARY

In an embodiment, a vision sensor system for a mobile platform is provided. The system includes: an on-board camera generating camera data; and a processor programmed to receive the camera data, and: identify a light source location in a frame of camera data; identify a region of interest (ROI) associated with the light source; increment the frame of camera data; calculate a signal to noise ratio (SNR) at the light source; store a frame number with the SNR; identify banding when it is present; identify flicker when it is present; and responsive to identifying flicker, generating a response.

In an embodiment, the processor is further programmed to identify the light source location by identifying a brightest pixel.

In an embodiment, responsive to identifying banding, the processor is programmed to generate a response.

In an embodiment, the processor is further programmed to generate a response by employing a compensation technique on a display system, and wherein the compensation technique includes feathering, to fill in missing pixels.

In an embodiment, the processor is further programmed to generate the response by generating an alert for a machine vision system.

In an embodiment, the processor is further programmed to identify the ROI by processing the light source location with object recognition data.

In an embodiment, the processor is further programmed to identify the ROI by processing the light source location with geographic position system (GPS) data.

In an embodiment, identifying flicker comprises determining, for N frames, that 50% of the N frames the SNR is over a SNR threshold.

Also provided is a processor-implemented method for vision sensing in mobile platforms, including: identifying a light source location in a frame of camera data; identifying a region of interest (ROI) associated with the light source; incrementing the frame of camera data; calculating a signal to noise ratio (SNR) at the light source; storing a frame number with the frame of camera data and the SNR; identifying banding when it is present; identifying flicker when it is present; and responsive to each of: identifying banding and identifying flicker, generating a response.

In an embodiment, the method further comprises identifying the light source location by identifying a brightest pixel.

In an embodiment, the method further comprises generating a response by employing a compensation technique on a display system.

In an embodiment, the compensation technique includes feathering, to fill in missing pixels.

In an embodiment, the method further comprises generating the response by generating an alert for a machine vision system.

In an embodiment, the method further comprises identifying the ROI by processing the light source location with object recognition data.

In an embodiment, the method further comprises identifying the ROI by processing the light source location with geographic position system (GPS) data.

In an embodiment, identifying flicker comprises determining, for N frames, that 50% of the N frames the SNR is over a SNR threshold.

In another provided embodiment, a mobile platform is provided, including: a camera mounted on the mobile platform and generating camera data; a processor programmed to receive the camera data, and: identify a light source location in a frame of camera data; identify a region of interest (ROI) associated with the light source; increment the frame of camera data; calculate a signal to noise ratio (SNR) at the light source; store a frame number with the frame of camera data and SNR; identify banding when it is present; identify flicker when it is present; and responsive to each of: identifying banding and identifying flicker, generating an alert for a machine vision system.

In an embodiment, the processor is further programmed to identify the light source location by identifying a brightest pixel.

In an embodiment, the processor is further programmed to generate the response by employing a feathering technique on a display system, to fill in missing pixels.

In an embodiment, the processor is further programmed to identify the ROI by processing the light source location with each of: object recognition data and geographic position system (GPS) data.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
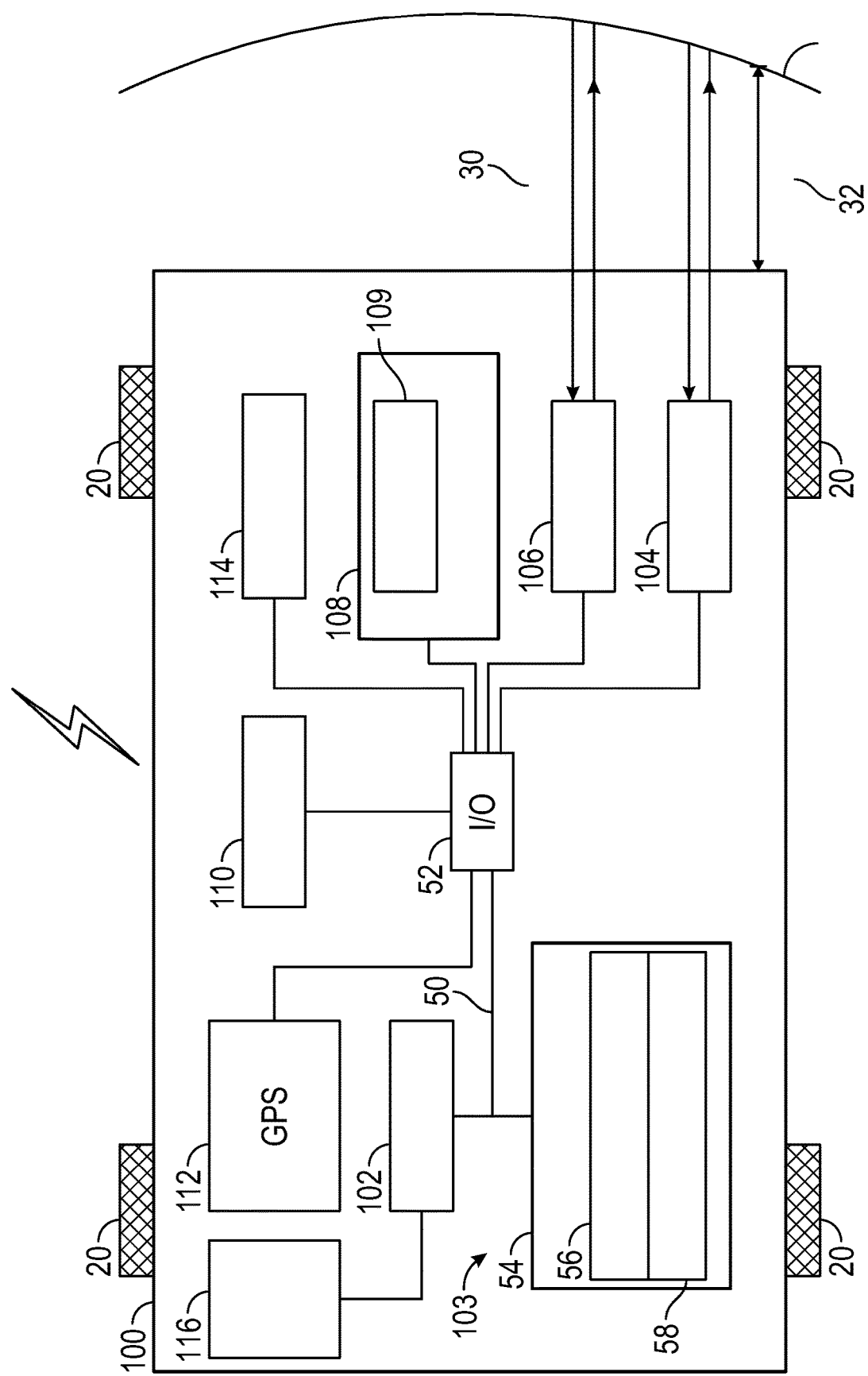
FIG. 1 is a schematic diagram illustrating a vehicle that includes a vision sensor system, in accordance with various embodiments.

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the functionality attributed to the module. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As mentioned, in practice, a LED pulse frequency may not perfectly coincide with camera exposure time, resulting in some of the frames of camera data incorrectly indicating that the LED is off. In practice, over a plurality of frames of camera data, incorrect determinations can cause undesirable technological effects in images rendered on a display system, such as flicker and banding. Some available vision sensor systems and methods employ LED flicker mitigation strategies downstream in the data processing flow, e.g., at the point of rendering an image, to address these technological problems. Exemplary embodiments of an enhanced vision sensor system and method employ data manipulation strategies essentially in real time, independent of the camera; the provided algorithm (FIG. 1 program 56) only monitors the frame data, received in a plurality of frames, also referred to as video. Therefore, any image can be generated for display on a display system (reducing cost) and any setting on an imager in a camera can be used. The enhanced vision sensor system and method are described in more detail in connection with the figures below.

FIG. 1 depicts an example mobile platform. The example mobile platform is a vehicle 100 that is capable of movement and carrying passengers from one location to another. The vehicle 100 is depicted in the illustrated embodiment as a passenger car, but other vehicle types, including motorcycles, taxi cabs, vehicle fleets, buses, sedans, wagons, trucks, sport utility vehicles, other automobiles, recreational vehicles (RVs), locomotives, and other vehicles may also be used. As is generally understood, the vehicle 100 may embody a body, chassis, and wheels, each of which are rotationally coupled to the chassis near a respective corner of the body. The vehicle 100 is depicted with four wheels 20, but the number of wheels 20 may vary in other embodiments. The vehicle 100 may be autonomous or semi-autonomous.

The example vehicle 100 includes a number of communicatively coupled components. Non-limiting examples of the communicatively coupled components include a sensor system 104, a camera 106 system, a display system 108, a transceiver 110, a geographic positioning system (GPS) 112, a processor 102, a machine vision system 116, and a storage device, storage 54. The processor and storage 54 may communicate with other components onboard the vehicle 100, via a bus 50, and a communication fabric, referred to as an input/output or 52. The vehicle 100 is also understood to include a collective functional block, drive systems 114, which generally includes known vehicle systems for vehicle operation, such as, a propulsion system, a transmission system, a steering system, actuators for the wheels, and a brake system, and generates a variety of signals, including vehicle speed and vehicle acceleration. The drive systems 114 and other on-board systems provide signals to the processor 102 from which the processor 102 generates, as outputs, controls for the camera 106 system and for the display system 108. In various embodiments, on-board systems, such as the drive systems 114, utilize various processor 102 outputs, such as generated images from machine vision systems and sensor systems, to control various aspects of vehicle 100 operation for example, by controlling traction devices associated with the wheels and brakes.

The vehicle 100 includes a vision sensor system, shown generally as system 103. A technological improvement delivered by the system 103 is real time LED flicker and banding detection. Various embodiments of the system 103 further provide LED flicker correction and/or LED banding correction.

Returning to the FIG. 1, the functions and operations of each of these components are described in more detail below.

The sensor system 104 includes one or more sensing devices that sense observable conditions of the exterior environment (such as surface condition, precipitation, light level, distance to objects, and the like) and generate sensor data relating thereto. The sensing devices might include, but are not limited to: radars (e.g., long-range, medium-range-short range), lidars, ultrasonic sensors, odometry sensors (e.g., encoders) and/or other sensors that might be utilized in connection with systems and methods in accordance with the present subject matter. Non-limiting examples of characteristics that may be embodied in the sensor system data include a distance to an object 32, an amount of precipitation, unevenness of the surface, presence of ice, presence of water, etc.

The camera 106 system may be mounted on the mobile platform, and may include one or more optical cameras (e.g., forward facing, 360-degree, rear-facing, side-facing, stereo, etc.), thermal (e.g., infrared) cameras, and the like. The camera 106 system senses light levels 30, luminance, edges, contrast, saturation of light, etc., and generates camera data based thereon. Non-limiting examples of characteristics that may be embodied in the camera data include panoramic view, amount of light, edges, contrast, saturation, etc. The camera 106 system is controlled by the processor 102. In various embodiments, the processor 102 commands the camera 106 system. In some embodiments, the processor 102 causes individual cameras in the camera 106 system to articulate to obtain images. Each camera of the one or more cameras has a respective frame rate and provides its respective camera data to the processor 102. During an initialization step, the processor 102 may assess and or program with predetermined settings: a number of available cameras, their frame rates, the portion of the external world that the camera data represents, and the like.

Display system 108 is configured to continuously receive and respond to display commands from the processor 102, and to display images and videos. The display system 108 includes a display device for presenting a displayed image 109. In various embodiments described herein, the display system 108 includes a synthetic vision system (SVS) and displayed image 109 is an SVS image. In exemplary embodiments, the display device is realized on one or more electronic display devices.

Transceiver 110 includes the hardware and software to support one or more communication protocols for wireless communication between the processor 102 and external sources, such as satellites, the cloud, communication towers and ground stations. In various embodiments, the transceiver 110 is configured to receive mapping data. In various embodiments, the transceiver 110 is configured to receive up-to-date high definition (HD) mapping data pursuant to a valid subscription and used by the GPS 112 and the processor 102. HD mapping data generally includes road geometries, road curvatures, slopes, angles, widths, speed limits, numbers and assignments of lanes (e.g., passing lanes, exit lanes, etc.), locations of tunnels, locations of covered bridges, locations of commercial parking garages, and the like.

The global positioning system (GPS) 112 performs the functions of subscribing to external mapping providers, for example, to obtain the up-to-date high definition (HD) mapping data. The GPS 112 also generates GPS data for the vehicle 100, including the location and movement of the vehicle 100. By comparing GPS data to camera data, the processor 102 may make determinations about objects and/or regions of interest nearby to the mobile platform. Although FIG. 1 depicts the vehicle 100 as having one direction, in various embodiments, the vehicle 100 can move in any direction, i.e., 360 degrees. Likewise, in various embodiments, the camera 106 system and the sensor system 104 also can obtain and process information in 360 degrees.

In an exemplary embodiment, the machine vision system 116 makes determination about the external environment of the mobile platform 100 and makes operational decisions for the mobile platform 100 that do not need human input. In exemplary embodiments, the machine vision system 116 embodies at least an object recognition algorithm. By comparing object recognition data to camera data, the processor 102 may make determinations about objects and/or regions of interest nearby to the mobile platform 100. During an initialization step, the machine vision system 116 may be updated or synchronized with other components of the system 103.

When the processor 102 processes the camera system data and detects flicker and/or banding therein, the processor 102 may further determine an appropriate correction. A non-limiting example of a correction directed to embodiments in which the display system 108 is viewed by a human includes applying a feathering technique to fill in missing pixels. A non-limiting example of a correction directed to embodiments in which the machine vision system 116 is used includes generating a warning and associating the warning with a related region of interest (ROI).

As used herein, the processor 102 facilitates communications and/or interaction between the components of the system 103 and performs additional processes, tasks and/or functions to support operations attributed to the system 103, as described herein. Depending on the embodiment, the processor 102 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

In various embodiments, the system 103 is realized as an enhanced computer system, comprising computer readable storage device or media, storage 54, for storage of instructions, algorithms, and/or programs, such as flicker and banding detection program 56 and a plurality of predefined profiles 58, the processor 102 to execute the program 56, and input/output interface (I/O) 52. The computer readable storage device or media, storage 54, may include volatile and nonvolatile storage in read-only memory (ROM), random-access memory (RAM), and keep-alive memory (KAM), for example. KAM is a persistent or non-volatile memory that may be used to store various operating variables while the processor 102 is powered down. The storage 54 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 102 in controlling the vehicle 100. In various embodiments, processor 102 is configured to implement the system 103.

The processor 102 may employ storage 54, to store and maintain algorithms and predefined variables for use in performing the tasks described herein, such as: signal to noise ratio (SNR) thresholds, definitions for brightness (e.g., more than 70% brighter than surrounding pixels), definition of flicker (e.g., an oscillation frequency), a definition of banding, a number (N) of frames to use in various calculations, and the like.

Information in the storage 54 may be organized and/or imported from an external source during an initialization or installment operation in a method; it may also be programmed via a user input device. The input/output interface (I/O) 52 may be operationally coupled to the processor 102 via a bus 50 and enables intra-system 103 communication. The input/output interface (I/O) 52 may include one or more wired and/or wireless network interfaces and can be implemented using any suitable method and apparatus. In various embodiments, the input/output interface (I/O) 52 supports communication with technicians, and/or one or more storage interfaces for direct connection to storage apparatuses.

During operation of the system 103, the processor 102 loads and executes one or more algorithms, instructions, and rules embodied as program 56, and, as such, controls the general operation of the system 103.

The processor 102 is programmed to receive the sensor data from the sensor system 104, and camera data from the camera 106 system. In various embodiments, the processor 102 may also receive updates to the GPS 112 and object information via the transceiver 110 during operation. Depending on the embodiment of the system 103, it may perform operations in accordance with an algorithm for flicker and banding detection, perform operations in accordance with state machine logic, perform operations in accordance with logic in a programmable logic array, or the like.

While the exemplary embodiment of the system 103 in FIG. 1 is described in the context of a fully functioning enhanced computer system, those skilled in the art will recognize that the mechanisms of the present disclosure are capable of being distributed as a program product including program 56 and the predefined profiles 58. Such a program product may comprise an arrangement of instructions organized as multiple interdependent program code modules, each to achieve a separate process, arranged to manage data flow through the system 103 (see, FIG. 2). The program code modules may each comprise an ordered listing of executable instructions for implementing logical functions for the processes performed by the system 103. The instructions, when executed by a processor, cause the processor to receive and process signals, and perform logic, calculations, methods and/or algorithms as described herein for automatically and in real-time generating tone-mapping settings and camera controls for the camera 106 system.

Once developed, the program code modules constituting program product may be stored and distributed individually, or together, using one or more types of non-transitory computer-readable signal bearing media may be used to store and distribute the instructions, such as a non-transitory computer readable medium. Such a program product may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as memory and as program product time-based viewing of clearance requests in certain embodiments.

Figure 2:
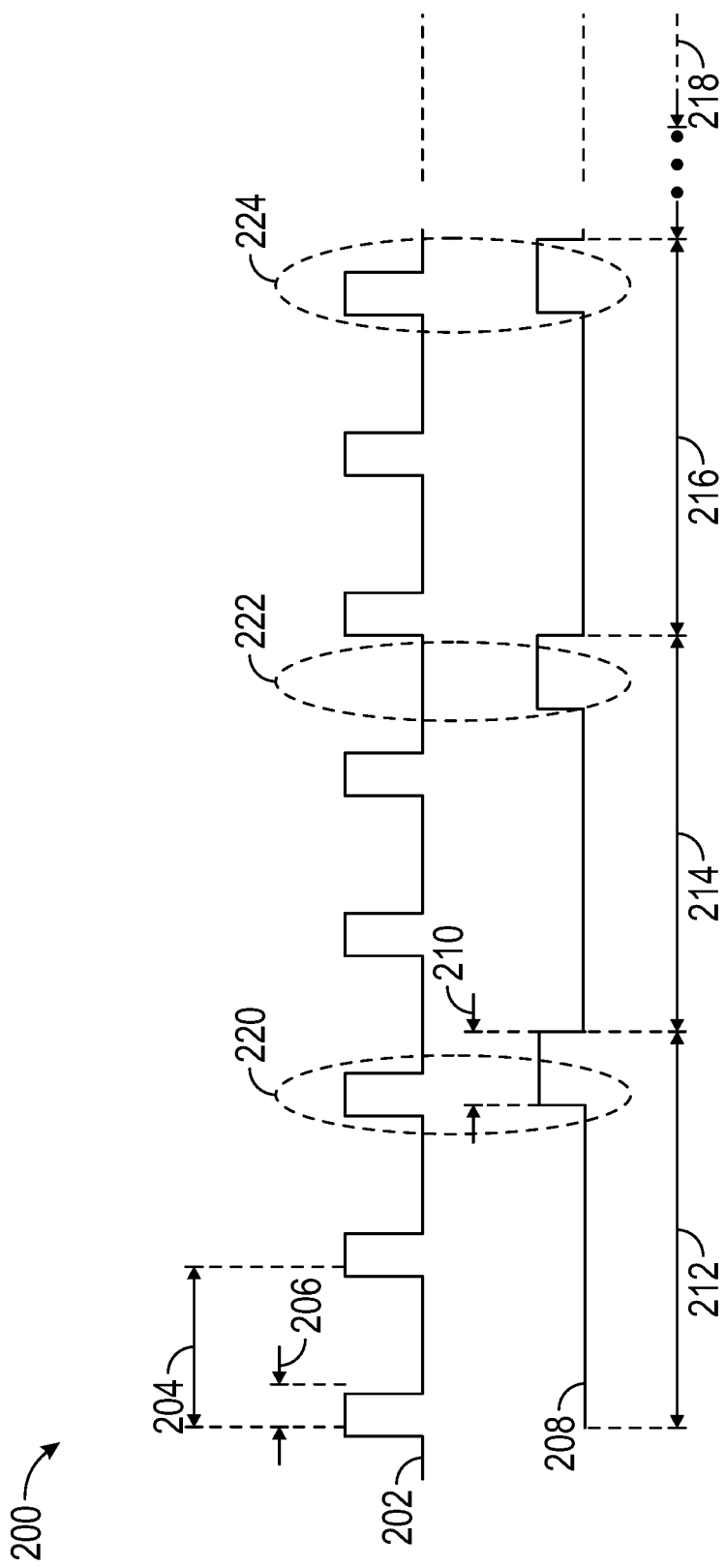
FIG. 2 is a timing diagram illustrating relationships between LED pulsing and camera exposure, in accordance with an exemplary embodiment.

Turning now to FIG. 2, an example timing diagram for an LED light is shown. A LED pulse 202 has an active time 206 (high) of 1 unit in a period 204 of 4 units. In this example, the LED is intended to be displayed as "on," so the period is sufficiently short to meet the human observation of a constantly lighted LED. The LED duty cycle is ¼ (high for 1 unit, low for the remaining 3 units in the period). Those with skill in the art will appreciate that, in practice, camera frame data may be captured as a two-dimensional (e.g., M×L) array of pixels. In these scenarios, each pixel may be evaluated as described in connection with FIG. 2.

The camera 208 exposure is also shown, having an exposed time 210 (high) of 2 units in a period of 10 units. The periodicity of the camera 208 is also referred to as a frame rate. N frames are shown: frame rate 1 212, frame 2 214, frame 3 216, and frame N 218. It can be seen that in frame 1, section 220, the camera 208 exposure coincides with the LED active time, based on this, the processor 102 would determine that the LED is lighted. In frame 2, section 222, the camera 208 exposure does not coincide with the LED active time; based on this, the processor 102 would determine that the LED is not lighted. In frame 3, section 224, the camera 208 exposure coincides with the LED active time, based on this, the processor 102 would determine that the LED is lighted. Accordingly, although the LED is constantly lighted, based on the camera data from the camera 208 exposure, the processor 102 detects flickering or banding.

Figure 3:
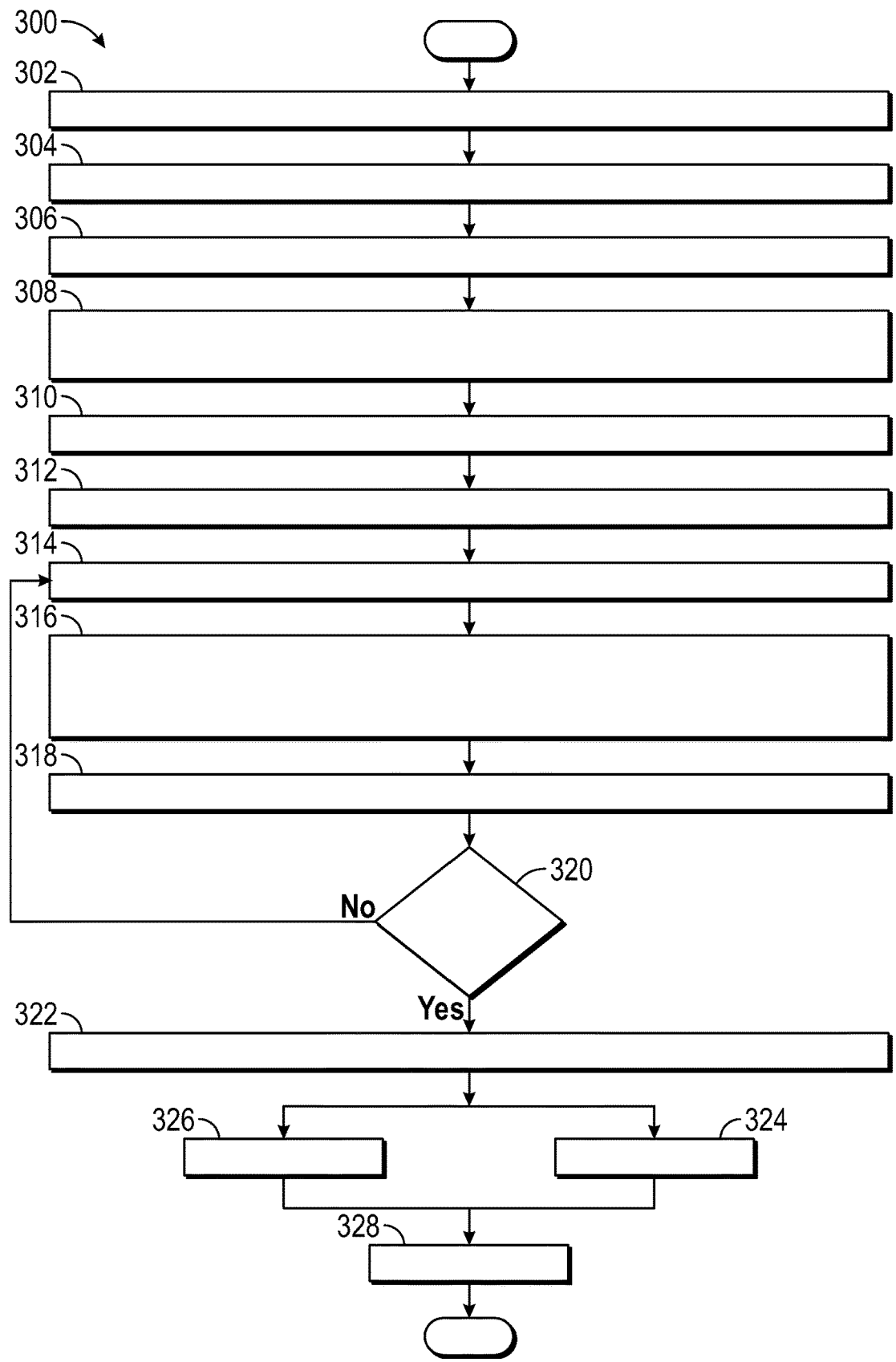
FIG. 3 is a process flow chart depicting an example method for vision sensing in a mobile platform, in accordance with various embodiments.

Turning now to FIG. 3, the system 103 described above may be implemented by a processor-executable method for vision sensing, shown generally as method 300. For illustrative purposes, the following description of method 300 may refer to elements mentioned above in connection with FIGS. 1-2. In practice, portions of method 300 may be performed by different components of the described system 103. It should be appreciated that method 300 may include any number of additional or alternative operations and tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 as long as the intended overall functionality remains intact.

At 302, the system 103 is initialized. When implemented as an enhanced computer system (e.g., FIG. 1), initialization at 302 may comprise uploading, installing, or updating the instructions constituting the program 56 and the plurality of predefined profiles (PDPs) 58 for execution by the processor 102. At 304, the processor 102 may further initialize the on-board camera 106 system, the display system 108, and the machine vision system 116. Initializing the machine vision system 116 may include synchronizing with or updating an object recognition algorithm.

At 306, the processor 102 is receiving camera data for processing on a frame by frame basis. On the first pass through 306, a first frame of camera data is received, i.e., frame number 1. Frame number is kept track of throughout the method 300. At 308, the processor 102 is processing the camera data with the algorithm and predefined variables to identify a light source location in the frame. The light source location may be identified by a brightest pixel, using a luminance measurement. The determination that it is brightest may include comparing it to other pixel luminance values and determining that its magnitude is greater than the others by at least a predefined threshold, for example, a brightest pixel may be more than 70% lighter (i.e., more luminant) than surrounding pixels.

At 310 a region of interest (ROI) may be defined, with respect to the light source. The processor 102 is programmed to identify the ROI by processing the light source location with each of: object recognition data and geographic position system (GPS) data. The processor 102 is programmed to identify the ROI by processing the frame using GPS data and/or object recognition to define the ROI. In a non-limiting example, the processor 102 processes the frame with object recognition data to identify the ROI as a rectangle, and further as a traffic light. At 312, the luminance measure of the light source is assigned as a signal reference for which to compare subsequent frame luminance values to. At 314, the frame of camera data is incremented. At 316, the signal to noise ratio (SNR) for the current frame (i.e., the incremented frame) of camera data is calculated by processor 102 by determining a luminance at the light source in the current frame (i.e., the incremented frame luminance measure), and subtracting the signal reference from it. At 318, the SNR and the frame of camera data is stored.

At 320, the frame number is compared to a predefined number N of frames, and the method 300 cycles back to 314 until the frame number is equal to N.

At operation 322, once N frames have been captured, the method moves to processing the N frames for the identification of banding and identification of flicker. At 322, the method compares, for each of the N frames, the SNR to the previous frame SNR, using a predefined SNR threshold to determine whether the SNR is moving over the N frames. The predefined SNR threshold may have a magnitude and be used in comparisons in both the positive and negative direction. For example, if a difference between two SNRs is a positive value greater than the positive SNR threshold, the SNR is determined to be increasing, and if the difference between the two SNRs is negative and greater than the negative SNR threshold, the SNR is determined to be decreasing. If the difference between two SNRs is within plus or minus the predetermined SNR threshold, the SNR is determined to be stable. The SNR may be determined to be increasing, decreasing, or stable at 322. When the SNR is increasing or decreasing, the SNR is considered significant by the algorithm in program 56; when it is significant between two sequential frames. Moving from one frame to the sequentially next or previous frame is referred to as one SNR step. At 324, the data for the N frames is processed to identify banding when it is present. In an embodiment, banding may be identified when there is one significant SNR step and not more, in the N frames. At 326, the data for the N frames is processed to identify flicker when it is present; flicker may be identified when there is more than one significant SNR step in the N frames. In an embodiment, flicker is identified when there is an oscillation of the SNR over the N frames; for example, 50% of the N frames SNR is over the SNR threshold, and 50% of the N frames the SNR is at or under the SNR threshold.

In various embodiments, once flicker is identified, a response is determined at 328. In various embodiments, once banding is identified, a response is determined at 328. In various embodiments, upon identifying each of: flicker and banding, a response is determined at 328. As mentioned, at 328, with regard to human vision and display system 108, the response at 328 may be a compensation technique, such as feathering, to fill in missing pixels on a displayed image. In embodiments using the machine vision system 116, the response at 328 may be the generation of an alert signal that is received and processed by the machine vision system 116. After operation 328, the process may return to operation 306 or end.

Thus, the provided system 103 and method 300 provide real-time LED flicker and banding detection for vehicles. The provided strategy and embodiments are independent of the camera, as the algorithm in program 56 only monitors the frame data, received in a plurality of frames also referred to as video. Therefore, any image can be generated for the display system (reducing cost) and any setting on an imager in a camera can be used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

What is claimed is:

1. A vision sensor system for a mobile platform, comprising:
    an on-board machine vision system configured to make operational decisions for the mobile platform that do not require human input;
    an on-board camera generating camera data; and
    a processor operationally coupled to the machine vision system and the onboard camera, and programmed to:
        receive a frame of camera data;
        identify a light source and a light source location in the frame of camera data;
        identify a region of interest (ROI) that is associated with the light source using an object recognition algorithm in the machine vision system;
        increment the frame of camera data;
        calculate a signal to noise ratio (SNR) for the light source in the incremented frame of camera data, compared to a luminance of the light source in the previous frame of camera data;
        store, for the incremented frame of camera data, a frame number with the SNR;
        repeat, a predefined number (N) times, the steps of increment, calculate, and store, thereby storing N frames of camera data;
        process the N frames of camera data to determine whether banding is present;
        responsive to determining that banding is present, generating a correction for the machine vision system;
        process the N frames of camera data to determine whether flicker is present; and
        responsive to determining that flicker is present, generating a correction for the machine vision system.

2. The system of claim 1, wherein the processor is further programmed to identify the light source location by identifying a brightest pixel.

3. The system of claim 1, further comprising a display system onboard the mobile platform, and wherein, responsive to determining banding is present and responsive to determining flicker is present, the processor is further programmed to generate a correction for the display system.

4. The system of claim 3, wherein the correction for the display system includes a compensation technique of feathering, to fill in missing pixels.

5. The system of claim 1 wherein, responsive to determining that banding is present, and responsive to determining that flickering is present, the processor is further programmed to generate an alert for the machine vision system.

6. The system of claim 5, wherein the processor is further programmed to identify the ROI by processing the light source location with geographic position system (GPS) data.

7. The system of claim 6, wherein identifying flicker comprises determining, for N frames, that 50% of the N frames the SNR is over a SNR threshold.

8. A processor-implemented method for vision sensing in mobile platforms, comprising:
   receiving a frame of camera data from an on-board camera;
   identifying a light source and a light source location in the frame of camera data;
   processing the light source location with an object recognition algorithm in the machine vision system to identify a region of interest (ROI) that is associated with the light source;
   incrementing the frame of camera data;
   calculating a signal to noise ratio (SNR) at the light source in the incremented frame of camera data, compared to a luminance of the light source in the previous frame of camera data;
   storing, for the incremented frame of camera data, a frame number with the frame of camera data and the SNR;
   repeating, a predefined number (N) times, the steps of incrementing, calculating, and storing, thereby storing N frames of camera data;
   processing the N frames of camera data to determine whether banding is present;
   responsive to determining that banding is present, generating a correction for an on-board machine vision system configured to make operational decisions for the mobile platform that do not require human input;
   processing the N frames of camera data to determine whether flicker is present; and
   responsive to determining that flicker is present, generating a correction for the machine vision system.

9. The method of claim 8, further comprising identifying the light source location by identifying a brightest pixel.

10. The method of claim 8, further comprising responsive to determining banding is present or responsive to determining flicker is present, generating a correction by employing a compensation technique on a display system.

11. The method of claim 10 wherein the compensation technique includes feathering, to fill in missing pixels.

12. The method of claim 8 further comprising, responsive to either determining banding is present or responsive to determining flicker is present, generating an alert for the machine vision system.

13. The method of claim 8, wherein identifying the ROI additionally comprises processing the light source location with geographic position system (GPS) data.

14. The method of claim 13, wherein identifying flicker comprises determining, for N frames, that 50% of the N frames the SNR is over a SNR threshold.

15. A mobile platform having on-board machine vision system that is configured to make operational decisions for the mobile platform that do not require human input, the mobile platform comprising:
   a camera mounted on the mobile platform and generating camera data;
   a processor operationally coupled to the machine vision system and the onboard camera, and programmed to:
   receive a frame of camera data;
   identify a light source and a light source location in the frame of camera data;
   identify, using an object recognition algorithm in the machine vision system, a region of interest (ROI) that is associated with the light source;
   determine a luminance of the light source in the frame of camera data;
   increment the frame of camera data;
   calculate, for the incremented frame of camera data, a signal to noise ratio (SNR) of the light source compared to the luminance of the light source in the previous frame of camera data;
   store, for the incremented frame of camera data, a frame number with the SNR;
   repeat, a predefined number (N) times, the steps of increment, calculate, and store, thereby storing N frames of camera data;
   process the N frames of camera data to determine whether banding is present;
   responsive to determining that banding is present, generating a correction for the machine vision system;
   process the N frames of camera data to determine whether flicker is present; and
   responsive to determining that flicker is present, generating a correction for the machine vision system.

16. The mobile platform of claim 15, wherein the processor is further programmed to identify the light source location by identifying a brightest pixel.

17. The mobile platform of claim 16, wherein, responsive to determining that banding is present, and responsive to determining that banding is present, the processor is further programmed to generate a correction for a display system that employs a feathering technique, to fill in missing pixels.

18. The mobile platform of claim 17, wherein the processor is further programmed to identify the ROI by processing the light source location with each of: object recognition data and geographic position system (GPS) data.

* * * * *